US 6,198,512 B1

(12) United States Patent
Harris

(10) Patent No.: US 6,198,512 B1
(45) Date of Patent: Mar. 6, 2001

(54) METHOD FOR COLOR IN CHROMATOPHORIC DISPLAYS

(76) Inventor: Ellis D. Harris, 1646 Lynoak Dr., Claremont, CA (US) 91711

( * ) Notice: Subject to any disclaimer, the term of this patent is extended or adjusted under 35 U.S.C. 154(b) by 0 days.

(21) Appl. No.: 09/437,128

(22) Filed: Nov. 10, 1999

(51) Int. Cl.$^7$ .................................................. H04N 5/58
(52) U.S. Cl. ............................ 348/603; 348/708; 348/649
(58) Field of Search ................................. 348/708, 739, 348/603, 602, 655, 656, 649, 808, 791; 345/84, 85; 382/162, 164, 167

(56) References Cited

U.S. PATENT DOCUMENTS

| | | | |
|---|---|---|---|
| 3,814,852 | * 6/1974 | Mierzwinski | 348/603 |
| 4,619,754 | * 10/1986 | Niki et al. | 204/290 R |
| 4,742,387 | * 5/1988 | Oshima | 348/603 |
| 4,965,574 | * 10/1990 | Fukushima et al. | 340/995 |
| 5,182,669 | * 1/1993 | Chikuma et al. | 355/241 |
| 5,252,719 | * 10/1993 | Takeda et al. | 530/409 |
| 5,291,560 | * 3/1994 | Daugman | 382/2 |
| 5,488,434 | * 1/1996 | Jung | 348/725 |
| 5,757,438 | * 5/1998 | Yoon et al. | 348/603 |
| 5,847,773 | * 12/1998 | Lagoni et al. | 348/603 |

* cited by examiner

Primary Examiner—Victor R. Kostak

(57) ABSTRACT

Color display pixels taken in localized groups are transformed from RGB color signals intended for a self-luminous display into WCMYRGBK signals to drive a chromatophore color display device. Each chromatophoric pixel is of one solid color and is selected from the group (White, Cyan, Magenta, Yellow, Red, Green, Blue, Black). Input luminosity resolution is maintained as output brightness resolution and color fidelity is preserved for the localized group. Separate totals are developed for the Red, Green and Blue components of pixels in a pixel group. A step-repeat process selects a specific chromatophore color for each pixel. As a pixel of the group is processed a chromatophore color is selected which best matches pixel color and the RGB components of the selected chromatophore color is subtracted form the group color totals. Very bright pixels are represented by White, light pixels are represented by Cyan or Yellow or Magenta, dark pixels are represented by Red or Green or Blue. Chromatophore color components are by nature utilized in quantum values. Following processing of a pixel or group of pixels any color remnants are carried over to an adjacent pixel or to the succeeding pixel group. Group RGB colors thus never deviate from the ideal by more than a small value and are recovered in the succeeding pixel group.

9 Claims, 8 Drawing Sheets

METHOD FOR COLOR IN CHROMATOPHORIC DISPLAYS

BACKGROUND OF THE INVENTION

The present invention relates to preparation of color image signals for display on a chromatophoric color display device.

A visual electronic display device consists of optical, mechanical, and electronic parts in an assembly that accepts data in an electronic form and provides a visual display of the data to an observer. In current society visual electronic displays are ubiquitous, being a requirement of every television set, every computer, and many dedicated products. Early display devices were limited to Black and White or monochrome. As color became available it quickly became the technology of choice. Of particular importance are color displays which possess a color gamut capable of reproducing the many hues, chromas, brightnesses and saturations of natural objects, which perform at television frame rates, and which address the needs of portable equipment, specifically in regards to battery power drain. There is also a particular need for displays that are viewable under very bright ambient conditions such as direct sunlight. Both of these needs are met by the inventive method presented herein when coupled with chromatophoric display device.

Electronic output display devices were popularized with the advent of television. Commonly images are presented at a rate of 30 frames per second. Each flame comprises two interlaced fields at 60 fields per second each as a means to reduce flicker. While television was initially in black and white, the development of color technology has made color the preferred approach. More recently a variety of displays have been developed and are under development. Many prior art displays are self luminous and the generation of light by the display itself or the inclusion of a dedicated light source is the major power need, the major source of waste heat, and for portable equipment, the major battery drain. An unavoidable result of a typical self-luminous display is brightness limitation. Under bright ambient conditions, as for instance outdoor sports events in broad daylight, a self-luminous display using a CRT or a liquid crystal display results in extremely poor visibility.

By contrast a chromatophoric display device is non self-luminous but utilizes ambient illumination. In this regard the chromatophoric display resembles a picture on a wall or in a magazine or an outdoor billboard. Brightness in reflected light replaces luminosity as a criterion.

This invention relates to, utilizes, and integrates a variety of technologies and disciplines, including:

CHROMATOPHORS

Chromatophore is the term used to designate selectable pigment elements to provide color selectivity in ambient illumination. The classical example is the color variation in certain animals, notably a chameleon, wherein changes of color are effected by means of pigment-bearing sacs. By analogy a chromatophoric display is a display wherein non self-luminous pixels change color and are viewable under ambient illumination. A first primary benefit of a chromatophoric display is that the display power supply need not provide illumination power. This is significant for portable display devices wherein power must be supplied by a battery pack. A second primary benefit is that the display is viewable under very bright conditions, such as direct sunlight. The utilization of CRT or other self-luminous displays in high ambient light environments is often disappointing in that there is insufficient illumination for viewing. By contrast, however, an out door sign such as a billboard is highly visible in bright sunlight. A chromatophoric display combines aspects of a painting hanging on a wall or an outdoor sign viewed in reflected light with the moving features of cinema or television. Like a picture on a wall it utilizes and requires ambient illumination for viewing.

The present inventive method provides means to transform RBG color signals as intended for color television or a color computer display into signals useful in chromatophoric displays.

Two of my patents/applications for chromatophoric displays have applicability and are incorporated herein by reference. The first U.S. Pat. No. 6,081,249 titled "WRAP AROUND MEMBRANE COLOR DISPLAY DEVICE" issued Jun. 27, 2000. The second titled "ROLLER OPTICAL GATE DISPLAY" has been declared "special" in view of the inventors age being over 65 years. This is identified as Ser. No. 09/336,802 (attorneys docket EDH/99001 submitted Jun. 11, 1999).

Color Science:

It has been demonstrated by prior art, in both xerography and offset printing that with black, cyan, magenta and yellow (CMY) dyes or pigments a full color palette is available. The additional colors of, red green and blue (RGB) can be made available either as separate toners or by dye-on-dye using the CMY toners.

The following color definitions are common in the industry and are incorporated herein:

BRIGHTNESS: Perceived quantity of visual flux.
HUE: Visual sensation to which an area appears to be similar to one of a set of standard colors, or combinations of these.
SATURATION: The colorfulness of an area judged in proportion to its brightness.
CHROMA: Colorfulness of an area judged as a proportion to brightness of a similarly illuminated area that appears White.
GAMUT: The three-dimensional color space that encompasses all of the colors reproducible by the process.
PALETTE: Specific colors available within the gamut.

Full color capability will include means to produce brightnesses, hues, saturations, and chromas of natural objects and scenes.

Color dye and pigment materials are in an advanced state of technology as a result of ink development in the printing industry, and toner development for color xerography. Pigments and dyes for the highlight colors of Cyan, Magenta and Yellow are capable of rendering highlight colors found in nature with high brightness and high fidelity. Relative to White the brightnesses of these highlight materials are equal to a shade of light gray. Pigments for the darker colors of Red, Green and Blue can be selected equivalent to the brightness of a dark shade of gray. These shades along with Black allow four levels of brightness for each pixel and a wide range of brightnesses are available for groups of neighboring pixels.

The human eye perceives color at a resolution significantly lower than its perception of brightness. If a display is configured to match brightness resolution to the capability of human vision then color of individual pixels is not resolved visually but will merge with adjacent color pixels into intermediate values of hue and chroma. As a result of this feature of human vision a very large number of hues and chromas can be made available from the eight basic primary colors at the same time high resolution in brightness is achieved. Because of this, a large color palette is obtainable with just eight common primary colors Black, Red, Green, Blue, Cyan, Magenta, Yellow, and White (KRGBCMYW). In the development of color television advantage was taken of the limitations of visual color resolution in expanding the early monochrome television to include color. The limited bandwidth required for color allowed color signals to be placed in unused potions of the spectra without requiring an increase in transmission bandwidth.

In self luminous displays, as for example a cathode ray tube, adequate color rendition can be achieved by employing Red, Green, and Blue patches in a localized group utilizing brightness control. In the case of reflective chromatophoric displays, however, the rendition of color highlights in a given area demand that all pixels in the area be of bright highlight color. Both the bright colors of Cyan, Magenta and Yellow and the darker colors of Red, Green and Blue, along with White and Black are needed to develop a full gamut.

A chromatophoric color display possesses the inherent capability for all pixels in any given area to be any of the bright primary colors, Cyan, Magenta, and Yellow. This capability allows the display of highlight colors in maximum brightness.

Where self-luminous displays are commonly characterized in terms of luminosity, chromatophoric displays must be characterized in terms of brightness.

Flicker is common in displays that rely on a phosphor since the phosphor for any given pixel is stimulated once only for each frame and the luminosity decays over the rest of the frame. In cinema flicker results from the limited fraction of time that the film gate is open during a frame time. A cinema frame is mostly all on when the film gate is open and mostly all off when the film gate is closed. By contrast in a chromatophoric display pixels once set remain fixed for an entire frame time, until reset in the following frame. Pixels in a frame are changed in sequence one at a time. Pixel brightness does not decay as in the case of the phosphor on a CRT. At no time is the frame completely Black as is the case between frames in cinema. As a consequence flicker in a chromatophoric display will be minimal or non-existent. Psycho-somatic effects induced by flicker as experienced by certain individuals will likewise be minimal or non-existent.

It is an object of this invention to provide a method for the transformation of Red, Green and Blue television and/or computer display signals into signals suitable for display on a chromatophoric color display.

It is a further object of this invention is to include in said transformation method means to preserve spatial resolution in luminosity as spatial resolution in brightness for a chromatophoric display.

It is another object of this invention to include in said transformation method the means to preserve the color qualities of brightness, hue, saturation and chroma of signals intended for a self-luminous display when transformed into signals for a chromatophoric color display.

It is an additional object of this invention to include in said transformation method means to perform the transformation at frame rates and pixel densities compatible with state of the art television and/or computer displays.

It is yet another object of this to provide a transformation method wherein advantage is taken of selected light pigment shades together with selected dark pigment shades for brightness control.

It as a further object of this invention to include in said transformation method means to enable the utilization of available pigments and/or dye materials in a chromatophoric color display.

It is still another object of this invention to provide an enabling means to implement chromatophoric displays that are nearly flicker free, that possess high visibility in high ambient light environments and wherein power is not required to generate display illumination.

SUMMARY OF THE INVENTION

Color display pixels taken in localized groups are transformed from RGB color signals intended for a self-luminous display into WCMYRGBK signals to drive a chromatophore color display device. Each chromatophoric pixel is of one solid color and is selected from the group (White, Cyan, Magenta, Yellow, Red, Green, Blue, Black). Input luminosity resolution is maintained as output brightness resolution and color fidelity is preserved for the localized group. Separate totals are developed for the Red, Green and Blue components of pixels in a pixel group. A step-repeat process selects a specific chromatophore color for each pixel. As a pixel of the group is processed a chromatophore color is selected which best matches pixel color and the RGB components of the selected chromatophore color is subtract group color totals. Very bright pixels are represented by White, light pixels are represented by Cyan or Yellow or Magenta, dark pixels are represented by Red or Green or Blue. Chromatophore color components are by nature utilized in quantum values. Following processing of a pixel or group of pixels any color remnants are carried over to an adjacent pixel or to the succeeding pixel group. Group RGB colors thus never deviate from the ideal by more than a small value and are recovered in the succeeding pixel group.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
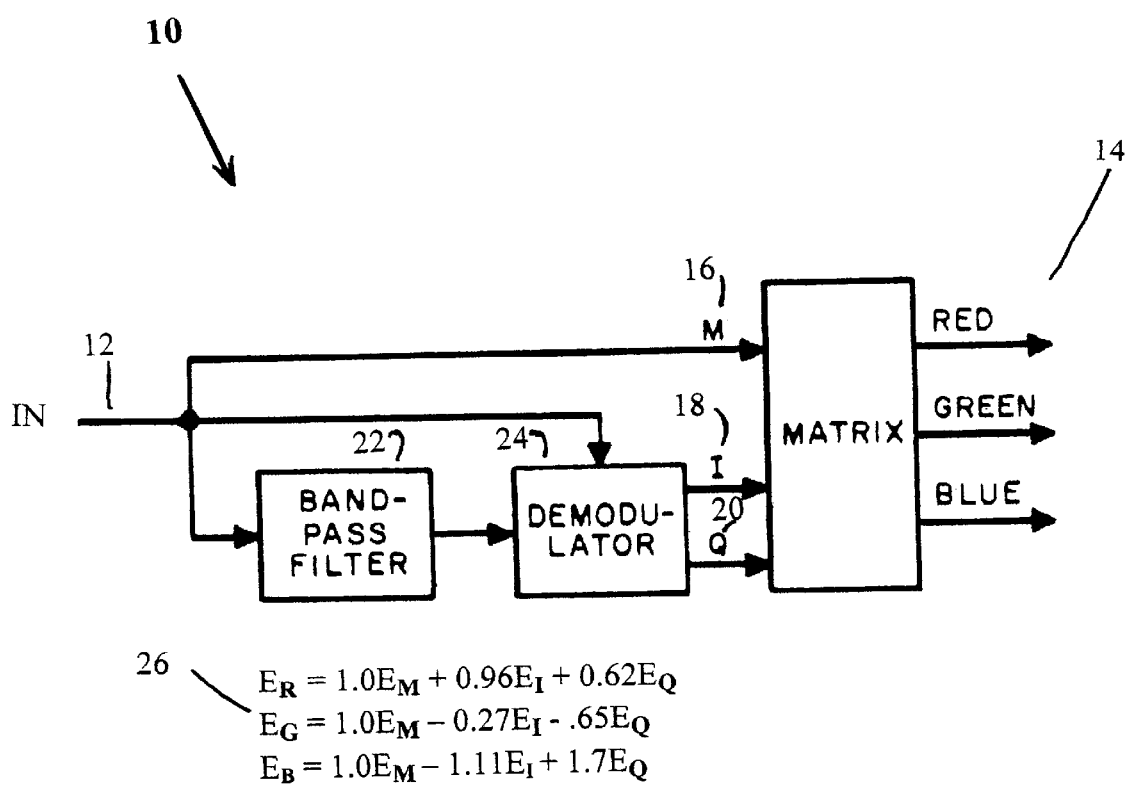
FIG. 1 is a block diagram of a color television demodulation circuit.

Reference now made to FIG. 1 wherein is shown a color demodulator block diagram 10. Input signal voltage 12 is demodulated to produce RGB signals 14 to drive a CRT or a liquid crystal display, not shown. This is a well-known block diagram and is taken form the ITT handbook "Reference Data For Radio Engineers", 1975 edition p. 30–35. The signal designated "M" represents the illumination portion of the composite television signal 12. In the absence of color demodulation the signal "M" would produce a monochrome television display. Color modulation components "I" 18 and "Q" 20 are derived by means of the band-pass filter 22 and the demodulator 24. RGB signal voltages 14 are developed from "M, I, Q" signals in accordance with the included equations 26. These three signal voltages develop the color display for a CRT or liquid crystal display.

Signals "M, I, Q" are inappropriate for developing chromatophoric display signals by the inventive method herein discussed. Summing the signal "M" over a local group of color pixels yields a value for the total illumination of the group. However, since both "I" and "Q" signals can include negative values as well as positive values, their sum over a pixel group tends toward zero and is thus valueless for deriving chromatophoric signals as discussed herein.

The inventive method for the development of chromatophoric signals makes use of the RGB signals 14. For any pixel the RGB signals summed together represents luminosity of the pixel and is equivalent of the "M" signal.

Figure 2:
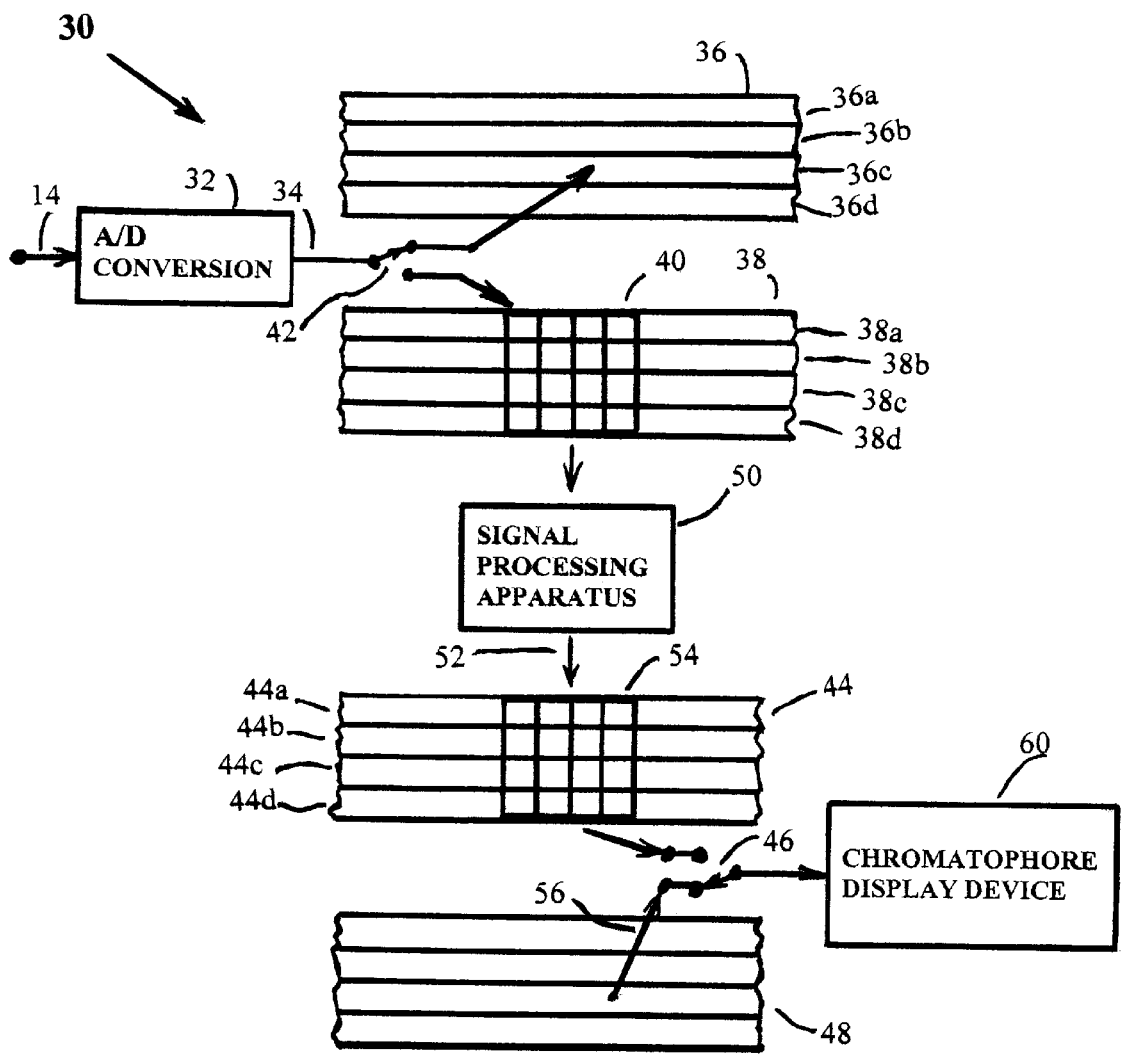
FIG. 2 illustrates the overall method for transforming color RGB signals to signals for utilization in a chromatophoric color display.

FIG. 2 represents a block diagram 30 of the method described herein. Analog RGB signals 14 are digitized by a digitizer element 32 to produce digitized versions 34. By means of signal switching means 42 digitized RGB signals are alternately scanned into a pair of input buffers 36 and 38 where the signals are addressable by scan line and pixel position. Means to accomplish this are well known both for scan interlace and for non-interlaced scans. When one of the two input buffers 36 or 38 has been filled then signal processing is initiated on that buffer while incoming signal is diverted by switching means 42 into the other input buffer. In this manner the buffers are used alternately.

Processing of signal within a buffer 36 or 38 proceeds from an input pixel block 40, typified by the 4×4 block illustrated. Transformation from input digitized RGB signal to output signal applicable to a chromatophoric display is accomplished by signal processing apparatus 50, described in detail later with reference to FIG. 6. Processed signal 52 is collected in output pixel blocks 54 wherein pixels correlate one to one with pixels in the input pixel block 40. A pair of output buffers 44 and 48 is utilized alternately to collect the processed signal. While signal 56 from one or the other output buffers 44 or 48 is being outputted to the chromatophoric display device 60 signal 52 from the processor apparatus 50 is diverted by switching means 46 to the other output buffer, and the buffers 44 and 48 are used alternately.

There will be a transportation time delay associated with the processing and a corresponding time delay must be introduced into the audio channel. Means for introducing time delay into the audio channel are well known.

Figure 3:
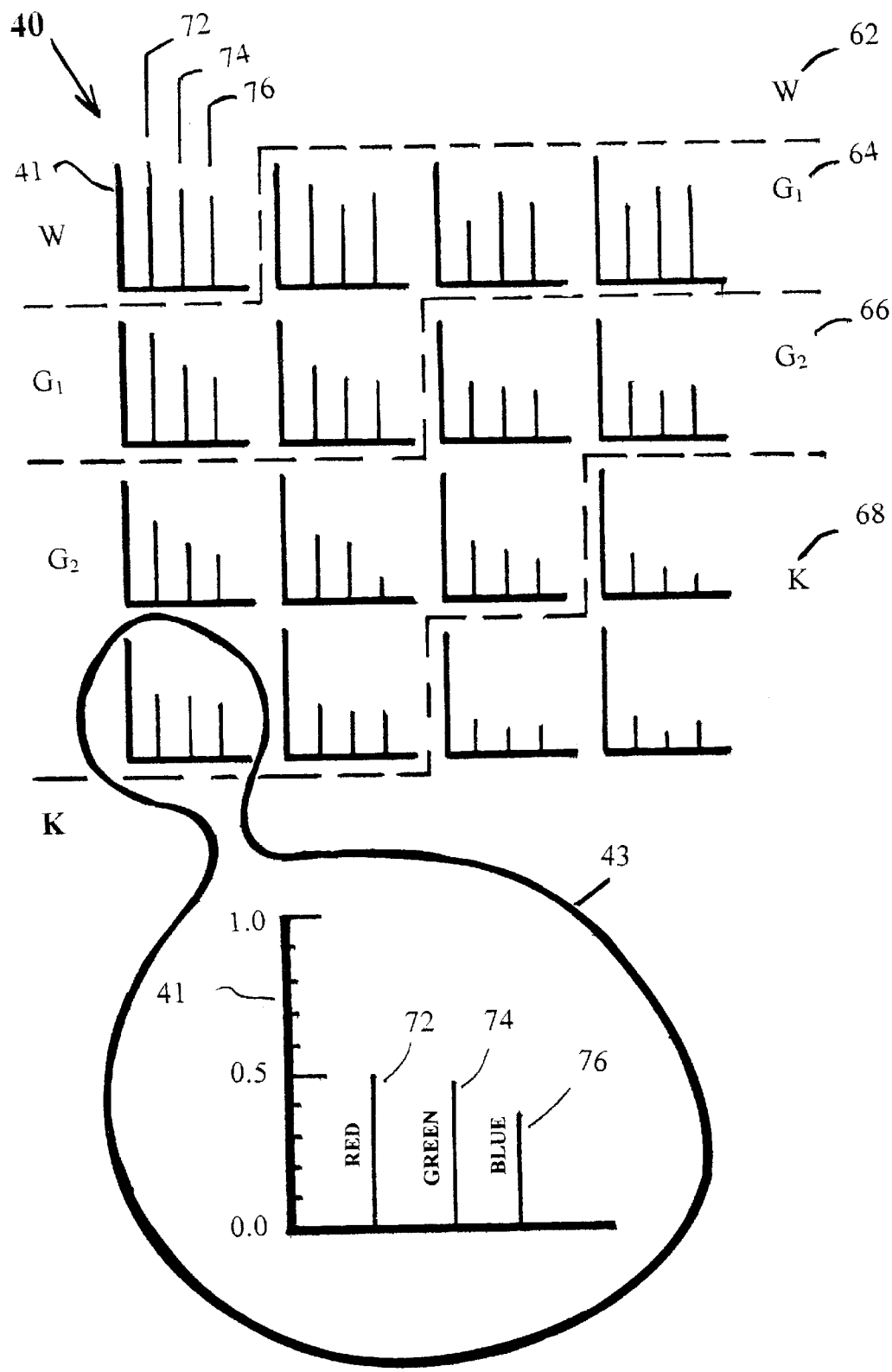
FIG. 3 shows RGB color components of a representative 4×4-pixel block.

FIG. 3 illustrates the Red, Green and Blue color components of a typical pixel block, typified by the 4×4 block 40. Four luminous levels are recognized. White, W, 62 is the brightest and will be implemented by a bright white chromatophore in the chromatophoric display device 60. Any one of the three colors (Cyan, Magenta, Yellow) produce a light intermediate luminosity, $G_1$, 64. Any one of the colors (Red, Green Blue) produce a dark luminosity, $G_2$, 66. Darkest luminosity will be represented by Black, K, 68. High resolution in luminosity is maintained by utilizing White and Black for pixels of the brightest and darkest luminosity respectively, by (at least approximately) employing the CMY color set for the light luminosity levels 64, and by (at least approximately) employing the RGB color set for the dark luminosity levels, 66. Because of characteristics of human vision the exact placement of pixel color is not as critical as pixel brightness placement. More important is providing the right color total in localized pixel groups. In FIG. 3 illustrative values for Red 72, Green 74 and Blue 76 intensities of pixels in a said pixel group 40 are shown by graphs 41. More detail of a graph 41 is illustrated in the expanded view 43.

Figure 4:
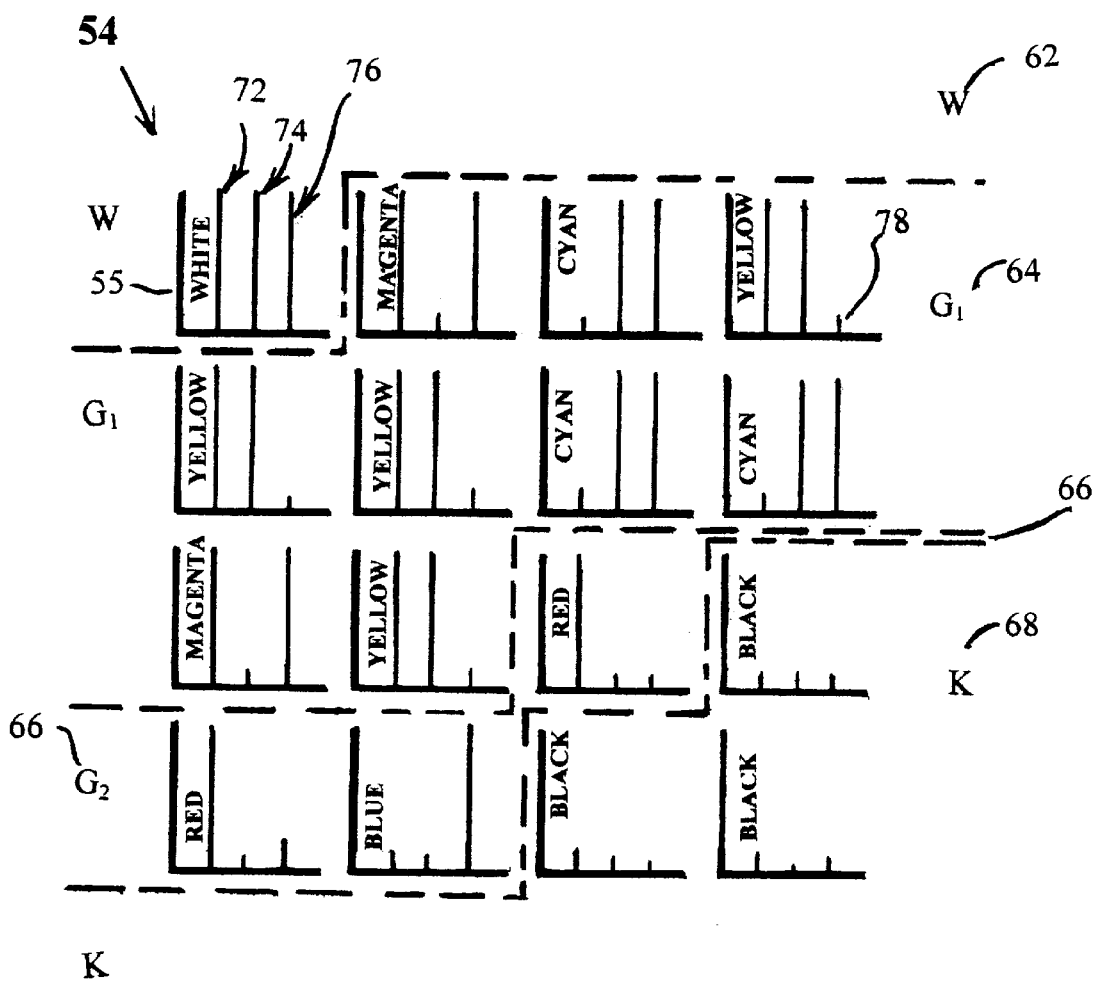
FIG. 4 illustrates color components of the chromatophoric display as produced by the method of the invention.

FIG. 4 illustrates the chromatophoric color block 54 obtained by processing said input RGB color block 40 in accordance with the inventive method. Pixels to be represented by White 62 in the chromatophoric display 60 are comprised of three RGB color components, Red 72, Green 74, and Blue 76 each in an integral value. Pixels to be produced at light intermediate brightness 64 are comprised of two RGB color components each in an integral value and are taken from a CMY color set. Pixels to be produced at dark intermediate brightness 66 comprise one component taken form an RGB color set in an integral value. In selecting colors for the intermediate brightness levels colors are selected to loosely maintain correct color for a given pixel. Overall color of the local pixel group 40 is maintained with high precision by the inventive method discussed herein.

It is anticipated that none of the colors actually available for utilization in a chromatophoric display device 60 will be pure RGB or pure CMY. Accordingly provision is included for utilizing available non-pure colors that have been calibrated for their Red, Green and Blue content. Color non-purity is indicated by cross-talk color 78 in the pixels of the pixel block 54.

Figure 5:
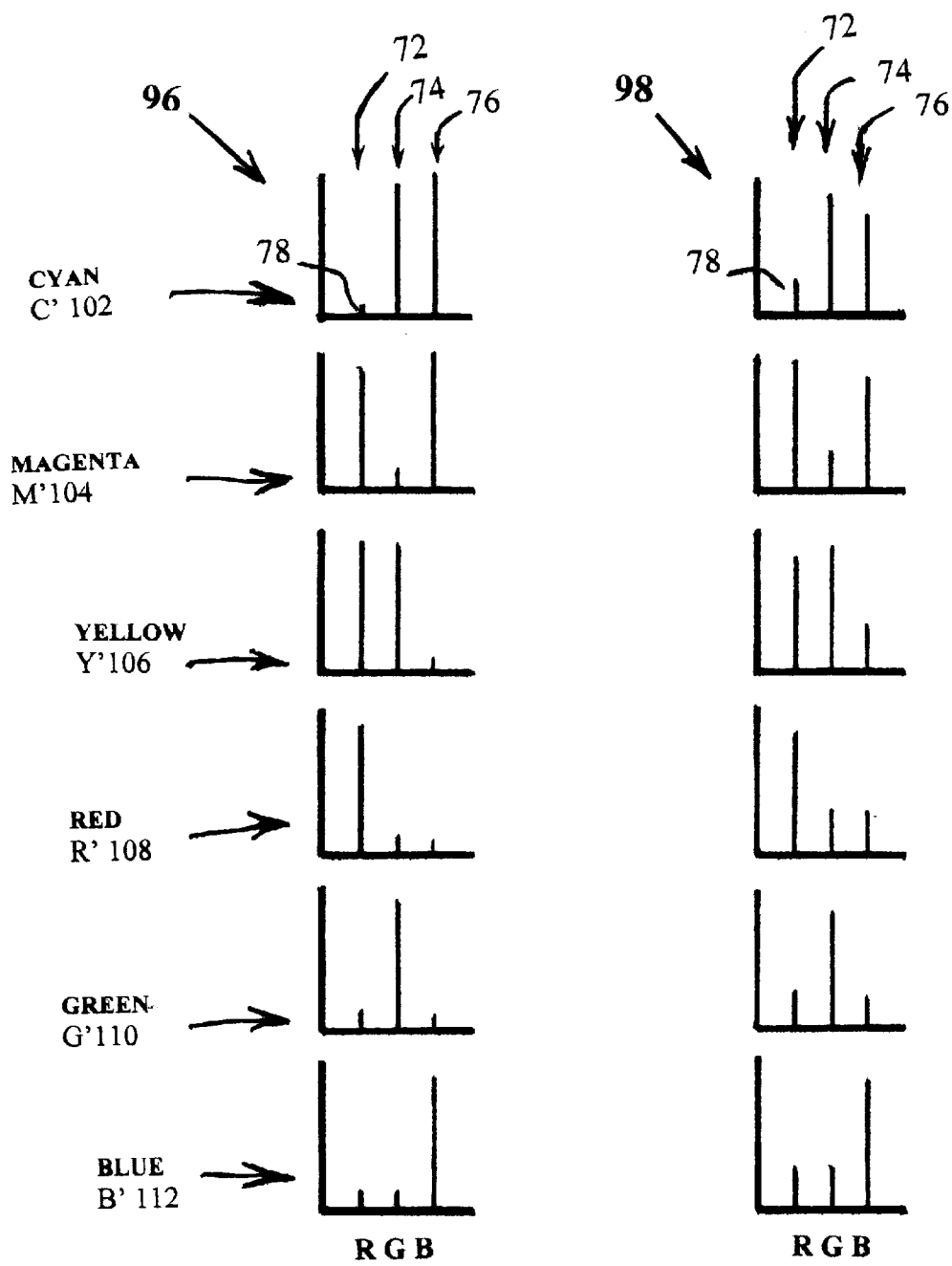
FIG. 5 shows hypothetical color components of two sets of chromatophoric colors; each comprised of the set (Cyan, Yellow, Magenta, Red, Green, Blue).

FIG. 5 shows chromatophore color elements illustrating two hypothetical sets 96 & 98 of available impure color. Available Cyan C' 102 includes components of Green 74 and Blue 76, along with a color cross-talk 78 value of Red 72. Available Magenta M' 104 includes components of Red 72 and Blue 76 with a color cross-talk 78 of Green 74. Available Yellow Y' 106 includes components of Red 72 and Green 74 along with a color cross-talk 78 of Blue. Available Red R' 108 will include a strong component of Red 72 along with cross-talk components of Green 74 and Blue 76. Available Green G' 110 will include a strong component of Green 74 and cross-talk components 78 of Red 72 and Blue 76. Available Blue B' 112 will include a strong component of Blue 76 and cross-talk components 78 of Red 72 and Green 74. The inventive method for the production of chromatophoric color enables means to utilize colors that are actually available but that are impure in that they contain cross-talk color as described above.

Figure 6:
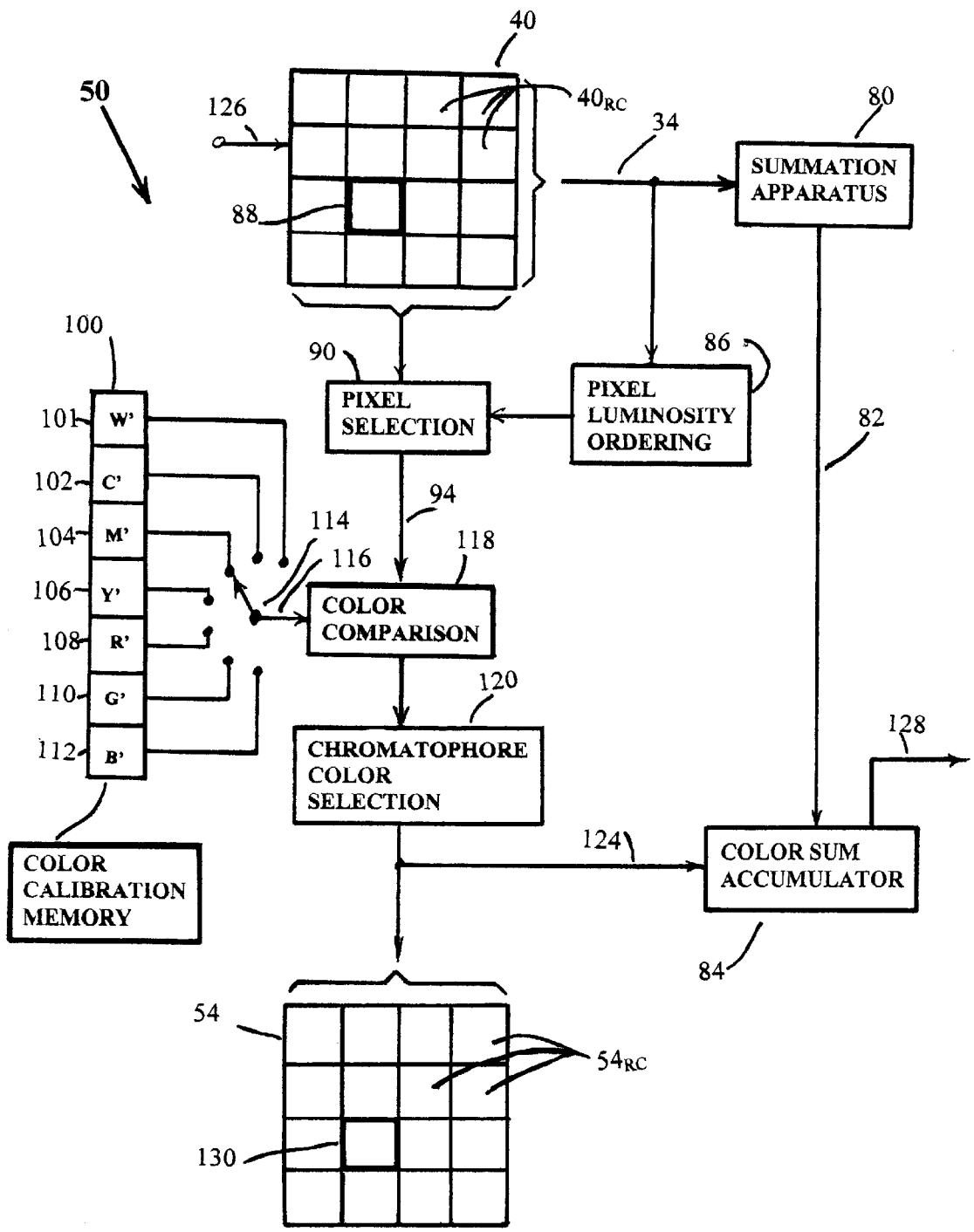
FIG. 6 is a more detailed block diagram of a portion of the block diagram of FIG. 2.

FIG. 6 illustrates details of the processor apparatus 50. A step-repeat process selects chromatophore colors. At any step the most luminous remaining pixel 88 of said pixel group 40 is processed. A chromatophoric color is selected (W'C'M'Y'R'G'B') that best matches pixel color and the RGB components of said selected color subtracted from pixel group color totals.

Figure 7:
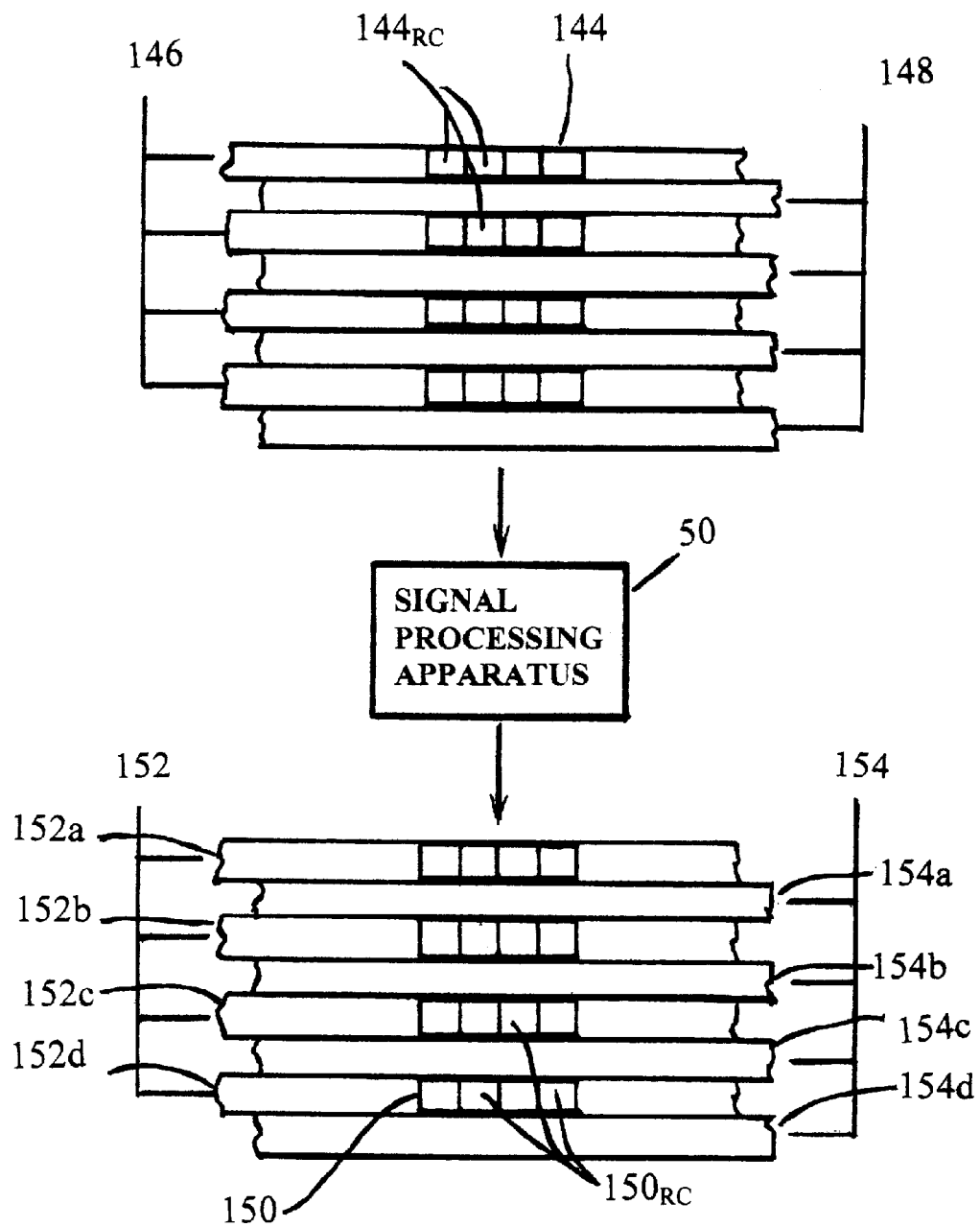
FIG. 7 illustrates a representative two-dimensional pixel block as implemented in field interlace television.

FIG. 7 also presents a two-dimensional chromatophore block 153 that is congruent with pixel block 144 for field scan interlace and is comprised of scan lines 152 and 154. Scan lines 152 are congruent with scan lines 144 and scan lines 154 are congruent with scan lines 146. As transformation from input RGB image data is processed into output chromatophore data the scan interlace is preserved. Input scan lines 146 from a first scan field are transformed into output chromatophore scan lines 152. Similarly, inputs scan lines 148 from the second scan field are transformed into output chromatophore scan lines 154 of the second scan field. As is the case with non-scan interlace, there is not a one-to-one relationship between elements of input blocks but block color is preserved as a whole. Spatial resolution of intensity is at least partially preserved by rearranging color elements within an output chromatophore block in accordance with intensity/brightness. The overall color presented by any block is preserved as color elements are rearranged.

When processing the color of a pixel group, such as the illustrative 4×4 pixel group 40 a first step comprises the generation of separate sums for the intensity values of Red, Green and Blue (RGB) colors 34 of a pixel group 40. These sums are generated by means of summation apparatus 80. These three sums 82 are supplied to an accumulator 84 where they are held to control the transformation from RGB signals to signals useful in a chromatophoric color display. A second step comprises ordering pixels in the group 40 according to luminosity (or brightness) by means of apparatus 86. In this step the pixels are also tagged for white W 62, light intermediate brightness $G_1$ 64, dark brightness $G_2$ 66 or black K 68. Thresholds between brightness boundaries are set to emphasize brightness to the extent that each chromatophoric pixel will contain slightly more brightness than the RGB pixel represented. By this means there is assurance that all of the color as represented in accumulator 84 will be employed before the processing of any pixel group 40 is complete. For all except the brightest pixel groups 40 there will be at least one pixel of the group 40 for which the chromatophore will be chosen as black. This feature will produce a limited amount of edge enhancement and emphasis brightness spatial resolution of the chromatophoric display.

Pixels of said pixel group 40 are selected for processing according to luminosity order. Pixel processing is by means of step and repeat. At any step selection apparatus 90 selects the most luminous remaining pixel 88. The RGB values 94 of the selected pixel 88 are then processed for transformation into a corresponding chromatophoric color. By means to now be discussed a chromatophoric color is selected which best matches the color of the selected pixel 88.

In the selection of colors for utilization as color elements in the chromatophoric color display 60 the colors will have been calibrated for their RGB content as illustrated in FIG. 5. These color calibration values 101–112 are stored in memory apparatus 100 and will be utilized in the color transformation from input RGB colors 14 to chromatophoric colors. For purposes of identification chromatophore colors are shown as followed by the prime symbol ('). In a preferred embodiment the selected colors comprise the set (W'C'M'Y'R'G'B'K') and the RGB values of these eight colors are calibrated relative to standard television RGB colors as typified by the RGB colors 14 of FIG. 1.

Each of the colors of the set (W'C'M'Y'R'G'B') will in general possess a component of each of the RGB colors as illustrated. Thus the selected White 101 W' will contain strong components of Red 72, Green 74 and Blue 76. The selected Cyan C' 102 will possess large components of G 74 and B 76 and a smaller component or R 72. The selected Magenta M' 104 will possess large components of R 72 and B. 74 and a smaller component of G 76. The selected Yellow Y' 106 will possess large components of R 72 and G 74 and a smaller component of B 76. Similarly, the selected Red R' 108 will possess a large component of R 72 and smaller components of G 74 and B 76. The selected Green G' will possess a large component of G 74 and smaller components of R 72 and B 76. And finally the Blue B' 112 selected for the chromatophoric color display will possess a large component of Blue 76 and smaller components of R 72 and G 74. By means of calibrating the selected chromatophoric colors and accounting for their RGB content colors that are actually available can be utilized to achieve a precision of color rendition in the chromatophoric color display.

Calibrated colors of the set (W'C'M'Y'R'G'B') stored in memory apparatus 100 are presented to a comparison unit 118 where they are compared with colors 94 of the brightest remaining pixel 88 of said pixel group 40. A decision unit 120 selects the best-correlated color for the corresponding chromatophoric color pixel 130. Pixels that have been identified as White will be given the chromatophore White W' 101. Pixels that have been identified as light intermediate brightness $G_1$ will be chosen from the light chromatophore colors: Cyan C' 102, Magenta M' 104, or Yellow Y' 106. Pixels that have been identified as dark intermediate brightness $G_2$ will be chosen from the dark chromatophore colors: Red R' 108, Green G' 110 or Blue B' 112. The RGB components 124 of the selected chromatophore color are supplied to accumulator 84 where they are subtracted from the values held therein. By this means the content of accumulator 84 represents remaining color yet to be implemented in the as yet un-processed pixels in a pixel group 40.

As pixels in said pixel group 40 is processed the accumulation held in accumulator 84 tends toward zero. When the accumulation is within about half of an integer value for each color of the set (RGB) then the color represented by the chromatophoric color display will be the best representation of pixels in the pixel group 40. Pixel colors selected for the chromatophoric color display correspond loosely to input pixel color while color of the pixel group 40 will correspond with high fidelity with the color of the pixel group 40 that is transformed. Sum held in accumulator 84 will approach zero at the conclusion of processing all pixels in said pixel group 40. At the conclusion of the above processes only small residual color values remain in the accumulator 84. These are carried over to the next pixel group as indicated by signal 128. Signal 126 indicates carry in from the preceding pixel group.

FIG. 7 illustrates a two-dimensional pixel block 144 for the case of field interlaced television. Scan lines 146 of a first field are interlaced with scan lines 148 of the second field. A pixel block 144 selected for transformation is comprised of pixels from scan lines from a given field where said scan lines are separated by a scan line space. Upon transformation to a chromatophoric pixel block 150 the resolution and color qualities of the spaced out pixels in the block are processed in the same manner as pixels in the closed pixel block 40. Luminous spatial resolution and color rendition is similar. Transformed pixels from interlaced blocks will merge to provide consistency in the display.

Figure 8A:
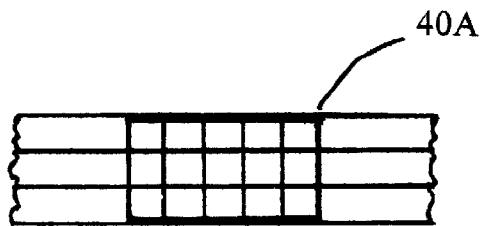
FIGS. 8A, 8B, 8C and 8D illustrate a variety of shapes for pixel blocks to be transformed.
Figure 8B:
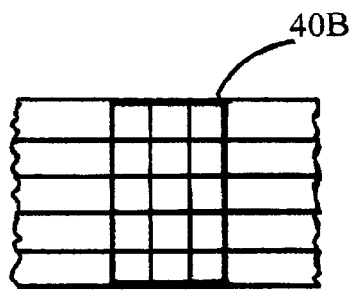
Figure 8C:
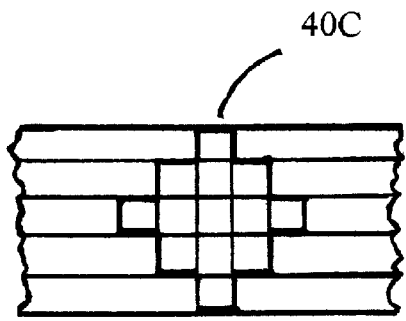
Figure 8D:
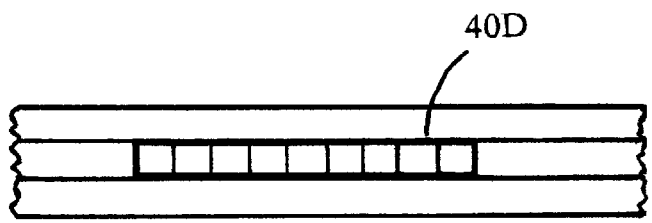

Many shapes for the pixel block 40 are possible as illustrated by the blocks shown in FIGS. 8A, 8B, 8C and 8D where a variety of shapes are shown. Similarly, a range in the number of pixels in a pixel block can be implemented. In general the fewer pixels in the block 40 the less apparatus will be needed for transformation. FIG. 8D shows a linear block of one scan line wide and many pixels long. This block would most nearly represent a pixel block typical of color television where chroma components are necessarily spread out along a scan line as a result of limited color bandwidth. Color fidelity is assured by the provision to carry over color remnants unusable in one pixel to the succeeding pixel group.

The results of the above-described transformation will be that display resolution of input signal 14 is preserved in its luminosity (brightness) and color aspects with good fidelity. The color aspect of input signal will be displayed at a lower spatial resolution but this is typical of color displays in general and is often inherent in the color signal to be transformed. Experience with color television has indicated that acceptable color displays are achieved with the reduced color spatial resolution resulting from the reduced color bandwidth. This is a providential aspect of vision wherein luminosity is perceived at a higher resolution than color.

In the invention these results are accomplished with realizable colors for the chromatophoric color display elements. Characteristics of the actual colors can be calibrated and included in the color transform. Over a range of actually available chromatophore element colors the input color of a block of pixels can be preserved with good fidelity.

The invention is a method and as such can be realized in a plurality of implementations. Display resolutions vary from the earliest television standards of 640×480 pixels to state of the art displays of 1600×1200 pixels. Computation data path widths of 32 bits are common and most probably adequate for the transformation. At the lowest pixel density some 20 million summation per second operations might be anticipated and perhaps 16 times this number at the higher pixel density. A pipelined approach would probably prove desirable. By this means chromatophore brightnesses within an potput pixel block 154 will at least loosely correlate with pixel intensities of pixels in input pixel block 40. These computation rates are well within state-of-the-art silicon electronics. As with all products cost efficiency will be determined by market volume.

What is claimed is:

1. A method for the transformation of RGB color image data into color data suitable for display of said color image on a chromatophoric display device wherein Red, Green and Blue color signals intended for display by means of a self-luminous display device are utilized to derive signals for driving chromatophore color elements of a chromatophoric display device wherein said chromatophore elements are not self-luminous but are viewable under ambient illumination, said method comprising:

means for converting input analog image data into digitized image data and, means for storing said digitized image data in blocks of at least one row and one column and, means for determining output display chromatophore elements in blocks congruent with said blocks of digitized image data and, a set of chromatophore colors that will be utilized for a chromatophore display and, further comprising:

a first step comprised of converting analog RGB signals presented as a raster scan into digital image color values and, a second step comprised of storing a plurality of at least one scan line of said digital image color pixels in one of a pair of input storage means while color pixels stored in the other of the pair of input storage means are being processed and outputted to one of a pair of output storage means and, a third step comprised of obtaining and storing sums of Red color values, sums of Green color values, and sums of Blue color values of said stored digitized pixels of a selected block of digitized color values, the color sums being taken of all pixels in said selected block and, a fourth step comprised of tagging pixels of said selected block in accordance with pixel luminosity values and, a fifth step comprised of comparing red, green and blue color values of said stored input image digitized pixels with red, green and blue color values of said set of chromatophore colors and selection of a color for chromatophore elements in said output storage means wherein an at least approximate best color match is achieved for each chromatophore element and its congruent stored pixel and, wherein a bright White chromatophore is selected for color values near maximum luminosity, a bright Cyan or Magenta or Yellow chromatophore is selected for luminosities in a range of approximately two/thirds maximum luminosity, less bright Red, Green or Blue chromatophore is selected for luminosities in a range of approximately one/third maximum luminosity and Black is selected for pixels darker than the said less bright range and, a sixth step wherein Red color values, Green color values and Blue color values of chromatophore color selected for a pixel are subtracted from said color sums and the subtraction remainder distributed over adjacent remaining stored digital image color pixels and, a seventh step wherein chromatophores in one of said pair of output storage means is outputted to said chromatophore display device while the other of the said pair of output storage means is receiving chromatophore data.

2. The method of claim 1 wherein as a chromatophore color is selected to represent color of a pixel of a said block of pixels and the RGB color components of said selected chromatophore color are subtracted from said stored color sums and subtraction remainders distributed over adjacent remaining stored image pixels as pixels of said block are processed in succession said color sums tend to approach zero.

3. The method of claim 2 wherein said set of chromatophore colors comprise at least approximately: White, Cyan, Magenta, Yellow, Red, Green, Blue and Black and, wherein Red, Green and Blue of said chromatophore color set comprise a low brightness subset and are at least approximately equal in brightness and are approximately one/third the brightness of the chromatophore White and, wherein Cyan, Magenta and Yellow of said chromatophore color set comprise a high brightness subset and are at least approximately equal in brightness and are approximately twice the brightness of said Red, Green and Blue subset and, wherein the brightness of White of said chromatophore color set is selected to be as bright as practical and, wherein the Red, Green and Blue content of each color of said chromatophore color set is available for color comparison.

4. The method of claim 3 wherein said White, said high brightness color subset, said low brightness color subset and said Black are arranged within said blocks of chromatophore elements whereby brightness spatial resolution of an inputted RGB image is at least approximately maintained in the signal as transformed for a chromatophoric display and, whereby the total of the Red, Green, and Blue of a selected pixel block as transformed for a chromatophoric display is at least approximately maintained.

5. The method of claim 4 wherein said non-pure color are utilized for said chromatophore color set and wherein said non-pure colors have been calibrated for their red, green and blue color content.

6. The method of claim 5 wherein algebraic values of color sum residues left over after chromatophore colors have been selected for one said pixel block are carried over to an adjacent pixel block that is yet to be processed.

7. The method of claim 6 wherein said set of chromatophore colors comprises: a color near Black, a color near White, and a plurality of colors having a range of hues and shades that comprise a color gamut that at least approximates the gamut of a plurality of color defined black, red, green, blue, cyan, magenta, yellow and white and, wherein said plurality of colors comprise a high brightness subset having brightness values approximately two/thirds that of the selected White and a low brightness subset having brightness values aproximately one/third that of the selected White.

8. A block of at least one chromatophore element wherein the net color effect is at least approximately the same as that of a given block of at least one RGB pixel comprised of color pixels that are comprised of variable intensity values of Red, Green, and Blue colors whereby said block of chromatophore elements comprises a visual color representation of said block of RGB color pixels.

9. block of at least one chromatophore element of claim 8 wherein said chromatophores are arranged whereby White is utilized to represent areas of high brightness of said block of RGB color pixels, a high brightness color subset is utilized to represent areas of high intermediate intensity of said block of RGB color pixels, a low brightness color subset is utilized to represent areas of low intermediate intensity of said block of RGB color pixels and Black is utilized to represent areas of low intensity of said block of RGB color pixels whereby brightnesses within said block of chromatophore elements at least approximately represent intensity levels within said block of RGB pixels.

* * * * *